July 10, 1923. 1,461,241
J. C. HAGEY ET AL
MEANS FOR INSTRUCTION WITH RESPECT TO MUSICAL INSTRUMENTS
Filed Aug. 13, 1919 2 Sheets-Sheet 1
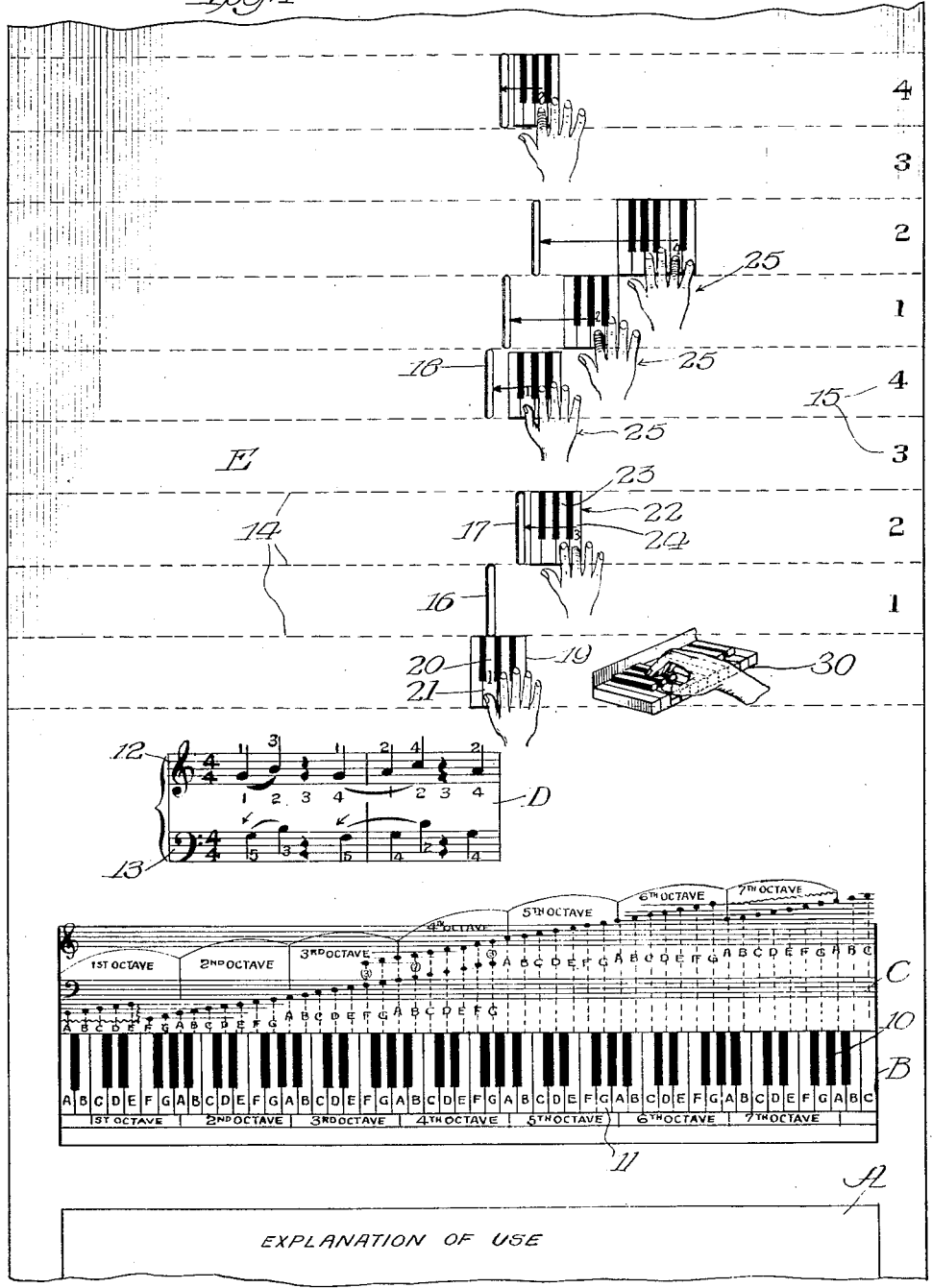

July 10, 1923.
J. C. HAGEY ET AL
1,461,241
MEANS FOR INSTRUCTION WITH RESPECT TO MUSICAL INSTRUMENTS
Filed Aug. 13, 1919    2 Sheets-Sheet 2
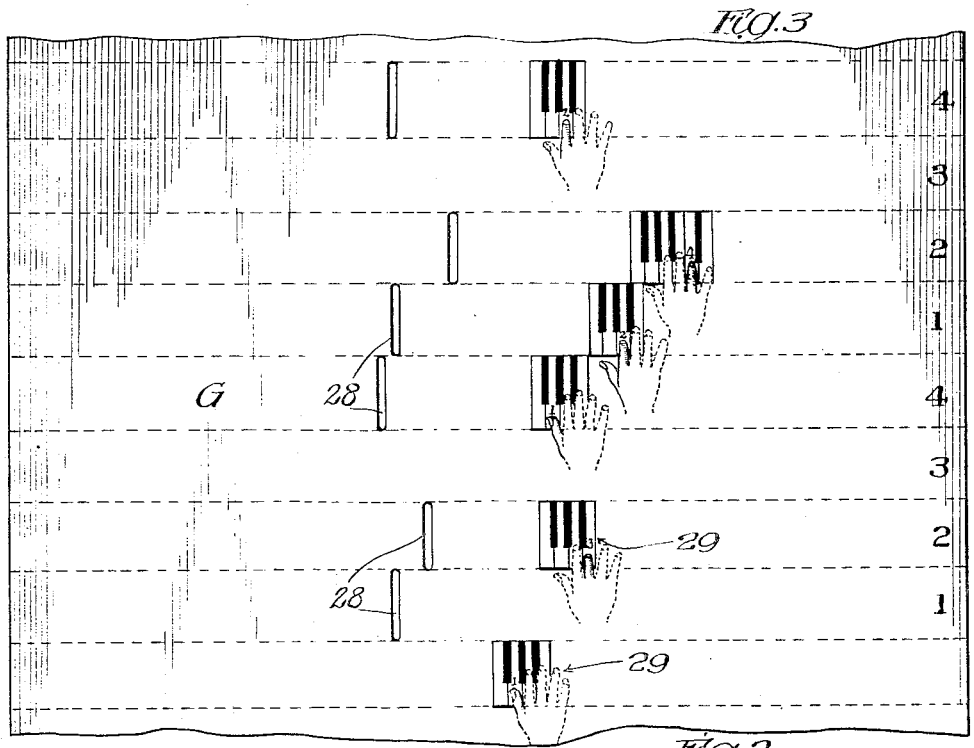
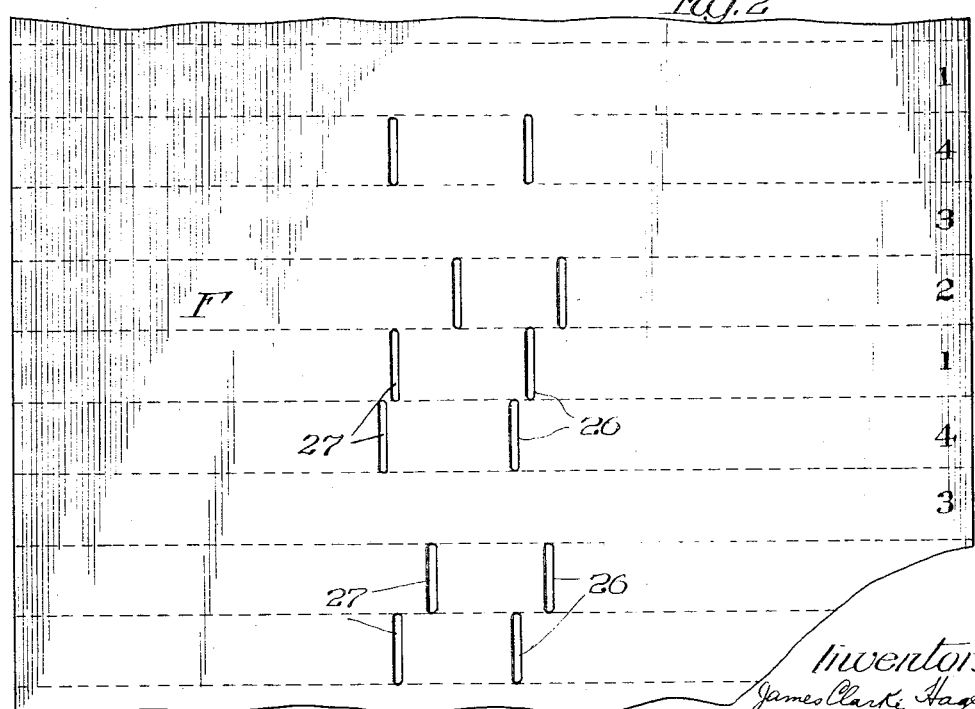

Patented July 10, 1923.

1,461,241

UNITED STATES PATENT OFFICE.

JAMES CLARKE HAGEY AND THOMAS E. KAVANAUGH, OF CHICAGO, ILLINOIS, ASSIGNORS, BY MESNE ASSIGNMENTS, TO THE Q R S MUSIC COMPANY, OF CHICAGO, ILLINOIS, A CORPORATION OF ILLINOIS.

MEANS FOR INSTRUCTION WITH RESPECT TO MUSICAL INSTRUMENTS.

Application filed August 13, 1919. Serial No. 317,159.

*To all whom it may concern:*

Be it known that we, JAMES CLARKE HAGEY and THOMAS E. KAVANAUGH, both citizens of the United States, both residing at Chicago, in the county of Cook and State of Illinois, have invented certain new and useful Improvements in Means for Instruction with Respect to Musical Instruments, of which the following is a full, clear, concise, and exact description, reference being had to the accompanying drawings, forming a part of this specification.

Our invention relates to a means for, and method of, instruction with respect to musical instruments. More specifically, it relates to what may be termed an "instruction-roll" for use with an automatic musical instrument, which instruction-roll will give the pupil information which will enable him (or her) to determine, from the usual written or printed music score, which of, when, and for how long, the note-sounding and other mechanical devices of the instrument should be actuated to produce the musical effects, represented by the notation and markings on the score.

The invention comprehends the placing of instructions, notation, and illustrations upon the music roll in such association and position, with regard to the usual perforations (or any other controlling means positioned in or upon the sheet), as to make the instructions (as applied upon the roll) exceptionally comprehensive, definite and clear, at the same time holding the attention of the scholar because of the interesting display of instructive illustrations and of the actual demonstrations automatically and faithfully given through automatic control of the operation of the several devices of the instrument.

Some of the objects of our invention are to provide a method of instruction which will be easy to understand, and which will not require a great deal of the instructor's time.

A further object of our invention is to provide means which, when used with the automatic musical instrument, will give to the pupil information which will enable him to play a selection corresponding to a written score.

Further objects will appear from the detailed description to follow and from the appended claims.

In the drawings, in which an embodiment of our invention is shown:

Fig. 1 is a plan view of a portion of an instruction-roll;

Fig. 2 is a plan view of another portion of the same instruction-roll; and

Fig. 3 is a plan view of still another portion of the same instruction-roll.

In order to give a general idea of the invention, it is here stated that the instruction-roll may be made in substantially the same form as the ordinary music-roll used with automatic musical instruments. The instruction-roll is provided with the score of some simple selection, written in ordinary notation, preferably near the front end of the sheet. This is the selection which the instruction-roll is to teach the pupil how to play. The score may include both the treble and bass of the selection. In the instruction roll shown, a part of the sheet following that on which the score is written is provided with perforations which will play the treble part of the score, and is also provided with depictions of portions of the key-board, and with depictions of the hand showing the proper position of the hand with respect to the keyboard, for causing the sounding of the notes corresponding to the written score and to the perforations in the sheet referred to.

A succeeding portion of the sheet is provided with perforations corresponding to both the treble and the bass of the written score. A later succeeding portion is provided with perforations corresponding to the bass portion of the score, and with depictions of portions of the key-board and with depictions of the hand corresponding to the treble portion of the score, but this portion of the sheet has no perforations corresponding to the treble portion of the score.

The instruction-roll as thus described might be used in this manner: The relation of the perforations and depictions to the written score is explained to the pupil, either by a written explanation on the instruction-roll or in any other desired way. The instruction-roll is placed in the roll box of an automatic musical instrument, in the manner in which a music-roll is ordinarily placed in position, and the automatic musical instrument is then put in operation to cause the instruction-roll to travel over the tracker. As the first portion of the instruction-roll referred to travels over the tracker, the notes corresponding to the treble portion of the written score will be sounded. With the usual type of automatic musical instruments, the instrument may be put in such condition that the keys corresponding to the notes sounded will be automatically depressed. The depictions of the portions of the key-board and hand show the pupil the proper positions of the hand with respect to the keys for the different notes sounded. The pupil is thus instructed through the sense of hearing, the sense of sight, and the sense of touch. He hears the notes sounded corresponding to the written score, sees the proper positions of the hand with respect to the keys corresponding to the notes sounded, sees the keys, corresponding to the notes, depressed, and places his hand in the positions indicated in the depictions, on the keys as they are depressed.

As the portion of the instruction-roll shown in Fig. 2 passes over the tracker, it will cause the notes corresponding to both the treble and bass of the written score to be sounded. This part of the instruction-roll is to show the pupil how the bass and treble of the written score will sound when played together. It provides an accompaniment for the treble part which was played as the part of the instruction-roll shown in Fig. 1 passed over the tracker. The pupil thus gets an idea of how the treble sounds alone, from the part shown in Fig. 1 and of how the treble and bass sound when played together, from the part shown in Fig. 2.

Then follows the part of the instruction-roll shown in Fig. 3, which is provided with perforations corresponding to the bass part of the written score, and with depictions of portions of the key-board and hand corresponding to the treble part of the written score. The purpose of this part of the instruction-roll is to assist the pupil in playing the air, at the same time that the accompaniment is automatically played. The preceding parts of the instruction-roll have already given the pupil instruction which will assist in this. Thus the part of the instruction-roll shown in Fig. 1 has shown the pupil the finger positions for the treble, at the same time that the treble notes were sounded, and has depressed the keys corresponding to these treble notes. The part of the instruction-roll shown in Fig. 2 has enabled the pupil to hear how the treble and bass will sound together. After the pupil has gotten all that can be obtained from the parts of the instruction-roll shown in Figs. 1 and 2, he is in a position to take up that part of the instruction-roll shown in Fig. 3, which is intended to enable him to play the air, while the accompaniment is automatically played.

Referring now to the drawings in detail, the instruction-roll shown may be provided, near its leader end, with printed matter A explaining the use of the instruction-roll. Following this it may be provided with a depiction B, of the key-board of a musical instrument, such as a piano, in conjunction with the musical notation C showing the notes corresponding to the keys of the key-board. Following this is the score D of a simple musical selection, which it is intended to teach the pupil how to play on the musical instrument. Following this part of the instruction-roll on which the score is written is a portion E provided with perforations corresponding to the treble part of the score D and provided with depictions of the portions of the key-board and hand. Following this is a portion F of the instruction-roll (Fig. 2) provided with perforations corresponding both to the bass and treble of the score D. Following this is a portion G of the instruction-roll (Fig. 3) provided with perforations corresponding to the bass portion of the score D and provided with depictions of the key-board and hand corresponding to the treble portion of the score D.

The keys 10 in the depiction B of the key-board may be so positioned that a perforation in the instruction-roll which is located in longitudinal alignment with any key 10 will cause a note to be sounded which corresponds to the said key. Each individual key may have indicated thereon a character 11 indicating the name of the key. The notation C which is located adjacent the depiction B of the key-board shows the location on the staff of the notes corresponding to the keys with which the notes are in longitudinal alignment. The notation C and the depiction B may be repeated at different convenient positions upon the sheet, for instance, between lessons or studies. The written score D comprises the treble and bass clefs 12 and 13 respectively, two measures of each being shown, the time being 4/4 time.

The portion E of the note-sheet may be divided into spaces, corresponding to the beats of the score D, by means of transversely extending lines 14. These spaces may be numbered 1, 2, 3, 4, as indicated at 15 to correspond to the beats of the measures. In the space bounded by the lines 14 and marked 1, to correspond with the first beat, the sheet is provided with a perforation 16, which perforation 16, as it crosses the tracker, will cause a note to be sounded corresponding to the first note in the treble clef, and will cause the corresponding key of the automatic musical instrument to be depressed. Similarly the space bounded by the lines 14 and designated 2 is provided with a perforation 17 which will cause a note to be sounded corresponding to the second note of the treble clef of the score D. The portion bounded by the line 14 and designated as 3 is blank paper corresponding to the third measure of the treble clef of the score, which, as will be noted, is a rest. The fourth measure of the portion E of the instruction-roll is provided with a perforation 18 corresponding to the fourth beat of the treble clef of the score D. Similarly, the succeeding divisions of the portion E are made to correspond with the notation of the treble clef of the score D.

A depiction 19, of a hand and a portion of the key-board is provided for the perforation 16, the key 20, which corresponds to the perforation 16, being placed in longitudinal alignment therewith, and the thumb of the hand is shown as placed on the key 20 to indicate that this key is to be played with the thumb. To further indicate that the thumb is to be used in playing this key, the numeral 1 is placed adjacent the thumb, it being understood that the numeral 1, when thus used, means that the thumb is to be used in actuating the key.

A depiction 22, of a hand and a portion of the key-board is provided for the perforation 17. In this case, however, the depiction 22 is placed to one side of the perforation 17 and an arrow leads from the key 23, which corresponds to the perforation 17. In this depiction a numeral 3 is placed adjacent the finger which is to be used in depressing the key as indicated at 24, it being explained to the pupil that the numeral 3, when thus used, means that the second finger is to be used in actuating the key. Similarly, the succeeding perforations in the portion E are provided with depictions 25 each comprising a hand and a portion of the key-board, to indicate what keys are to be depressed, and what fingers are to be used in playing, and to indicate also the correct positions. The portion E is thus provided with means 19, 22 and 25, for indicating to the pupil pictorially what keys are to be depressed to play the notes of the treble clef of the score D, what fingers are to be used in striking the keys, and also the correct positions of the hand.

As the pupil causes the instruction-roll to travel over the tracker he will observe the score D, and the depictions 19, 22 and 25, and will listen to the notes which are sounded, and will watch to see what keys of the instrument are depressed. He will attempt to strike the keys which are depressed, at the time they are depressed, with the fingers which the depictions indicate should be used, and with the hand in the correct positions shown in the depictions.

Coming now to the portion F of the instruction-roll, this is provided with perforations 26, corresponding to the notes of the treble clef, and with perforations 27, corresponding to the notes in the bass clef, of the score D.

After the pupil has become familiar with the instructions and information conveyed by the portion E of the sheet, he will cause the portion F of the instruction-roll to be run over the tracker. This will cause the sounding of the notes corresponding to both the bass and treble clefs of the score D. In other words, it will cause to be sounded the same notes which were caused to be sounded by the perforations in the portion E of the instruction-roll, and, in addition, will cause to be sounded the notes corresponding to the base clef of the score D, thus providing an accompaniment.

The pupil thus gets an idea of what the complete selection should sound like. This is of use in connection with the succeeding part of the instruction roll G, which causes the playing of an accompaniment in connection with which it is intended that the pupil shall play the air. This portion G is provided with perforations 28 which will cause to be sounded notes corresponding to the bass clef 13. No perforations are provided corresponding to the treble clef, but depictions 29 are provided corresponding to the depictions on the portion E, these depictions 29 indicating what keys should be depressed to cause the sounding of the note of the treble clef, what fingers should be used, and the correct positions of the hand.

As this portion G is run over the tracker, the perforations 28 cause the sounding of the notes corresponding to the bass clef 13, and the pupil is expected to play the note corresponding to the treble clef. He is assisted in doing this by his familiarity with the portion E of the instruction-roll which he has previously used, by his recollection of what the complete selection sounds like, which he got from the use of the portion F of the instruction-roll, and by the depictions 29, on the portion G, which show what keys are to be depressed, what fingers are to be used, and the proper positions of the hand.

There is thus a true combination between the various parts of the instruction-roll, although an instruction-roll provided only with the portion E might be used.

If desired, additional depictions such as indicated at 30 in Fig. 1, may be provided to make an additional showing of the proper position of the hand.

The use of the invention has been described in connection with the description of the instruction-roll. To recapitulate, the instruction-roll is provided with printed matter explaining its use, reference being made in this printed matter to the other parts of the instruction-roll. The pupil reads this explanation of use, or has it explained to him. After he has understood it, the instruction-roll is placed in position in the roll box of an automatic key-board musical instrument, and the instrument is put in operation to cause the instruction-roll to travel over the tracker. The pupil observes the sequence of notes in the written score D, and observes depictions of a hand and a portion of the key-board as they successively cross the tracker.

As a perforation crosses the tracker the pupil observes the corresponding depiction, observing what keys these depictions indicate should be repressed, what fingers should be used in depressing them, and the correct hand positions, and observing also, on the key-board of the automatic musical instrument, what keys are actually depressed, and places the finger indicated by the depiction, on the key which is depressed, holding the hand in the correct position as indicated by the depiction. He does this for the various keys as they are successively depressed, and thus goes through the motions of playing the treble part of the score.

After the pupil has used this portion E of the instruction-roll, to enable him to go through the motions of playing the treble portion of the score, the instruction-roll is advanced to cause the portion F of the instruction-roll to pass over the tracker. This portion F, as it passes over the tracker, causes the notes corresponding to both the treble and bass to be sounded. The pupil thus becomes familiar with the way the complete selection sounds.

After the pupil has thus gone through the motions of playing the treble part, and has become familiar with how the treble and bass sound together, the instruction-roll is advanced to cause the part G to pass over the tracker. As this part G passes over the tracker, the perforations 28 cause the notes to be sounded corresponding to the bass portion of the score. As the instrument automatically causes the bass notes to be sounded, the pupil tries to play the treble. He is assisted in this by the depictions 29, which show what key is to be depressed, what finger is to be used in depressing it, and the correct position of the hand. He is also assisted by his previous experience gained from the use of the portions E and F as the portion E has enabled him to go through the motions of playing the treble part (which is the part he is expected to play when the portion G travels over the tracker), and the portion F has enabled him to hear both the treble and the bass played together so that he knows how the part G should be made to sound.

While we have disclosed our novel means and method in connection with a very simple lesson, it is obvious that the means and method are applicable to and can easily be extended to more difficult lessons and instructions. Musicians will easily understand that the simple idea disclosed in Fig. 3, where the student is led into playing with an automatically played accompaniment or harmony, will be of considerable importance in the study of counterpoint and thorough bass where, for instance, the student may be led into playing against a counter theme or to compose and play a part in harmony with an automatically-played melody.

It is obvious that the printed matter A explaining the use of the instruction-roll, the depiction of the key-board B, the notation C and the score D (which are used in combination with the means for causing the sounding of the notes, and with the means for indicating how the selection should be played manually) may in some forms of our invention, be placed on sheets separate from the instruction-roll. It is also obvious that means may be provided which will indicate to the pupil the desired operation of various parts of a musical instrument, such as the loud and soft pedals, etc.

Having thus described our invention, what we claim as new and desire to secure by Letters Patent is:

1. A device, for use in an automatic key-board musical instrument, provided with means for selectively causing the sounding of the notes of a selection, and provided also with means for indicating to a pupil the keys which should be struck in playing the selection manually, said last means including key-board depictions.

2. A device, for use with an automatic key-board musical instrument, provided with means for selectively causing the sounding of the notes of a selection, and provided also with means for indicating to a pupil what fingers are to be used in manually playing the selection, said last means including depictions of a hand.

3. A device, for use with an automatic key-board musical instrument, provided with means for causing the sounding of the notes of a selection, and provided also with means for indicating to a pupil what keys are to be struck, and what fingers are to be used in manually playing the selection, said last means including key-board depictions and depictions of a hand.

4. A device for use with an automatic musical instrument, having a first portion provided with means for causing the sounding of the notes of a part of a musical selection, said first portion being provided also with means for indicating how said part is to be played manually, said device having a second portion provided with means for causing the sounding of the same notes as were caused to be sounded by said first portion, and provided also with means for causing the sounding of the notes of another part of the same musical selection.

5. A device, for use with an automatic musical instrument, having a first portion provided with means for causing the sounding of the notes of one part of a selection, said first portion being provided also with means indicating to a pupil how the part is to be played manually, said device having a second portion provided with means for causing the sounding of the same notes as were caused to be sounded by said first portion, and provided also with means for causing the sounding of the notes of a second part of the same musical selection, said device having also a third portion provided with means for selectively causing the sounding of the notes of the second part of said musical selection only, and provided also with means for indicating to a pupil how said first part is to be played manually.

6. An elongated instruction roll, for use with an automatic key-board musical instrument, provided with means for selectively causing the sounding of the notes of a selection, and provided also with means for indicating to a pupil what keys are to be struck in manually playing the selection, said last means comprising key-board depictions in which the depiction of the key to be depressed is in longitudinal alignment with the corresponding means for causing the sounding of the note.

7. A device, for use with an automatic musical instrument, provided with means for selectively causing the sounding of the notes of a selection, and provided also with pictorial means for indicating to a pupil the action desired of the pupil.

In witness whereof we have hereunto subscribed our names.

J. CLARKE HAGEY.
THOS. E. KAVANAUGH.